(12) United States Patent
Lovchik et al.

(10) Patent No.: US 11,781,954 B2
(45) Date of Patent: Oct. 10, 2023

(54) BRIDGING LIQUID BETWEEN MICROFLUIDIC ELEMENTS WITHOUT CLOSED CHANNELS

(71) Applicant: International Business Machines Corporation, Armonk, NY (US)

(72) Inventors: Robert Dean Lovchik, Schoenenberg (CH); Marie Salva, Stutensee (DE); Yuksel Temiz, Zug (CH); Emmanuel Delamarche, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 16/933,035

(22) Filed: Jul. 20, 2020

(65) Prior Publication Data

US 2022/0018744 A1    Jan. 20, 2022

(51) Int. Cl.
*G01N 1/40* (2006.01)
*B01D 39/16* (2006.01)
(Continued)

(52) U.S. Cl.
CPC ........... *G01N 1/4077* (2013.01); *B01D 29/03* (2013.01); *B01D 39/1623* (2013.01);
(Continued)

(58) Field of Classification Search
CPC ................ G01N 1/4077; G01N 1/10; G01N 2001/4088; B01D 29/03; B01D 39/1623;
(Continued)

(56) References Cited

U.S. PATENT DOCUMENTS

| 10,159,978 | B2 | 12/2018 | Linder | |
|---|---|---|---|---|
| 2011/0041591 | A1* | 2/2011 | Gupta | G01N 33/491 73/64.56 |
| 2014/0377852 | A1* | 12/2014 | Putnam | G01N 35/00029 422/63 |

(Continued)

FOREIGN PATENT DOCUMENTS

| EP | 3225309 A1 * | 10/2017 | ............ B01L 3/5023 |
|---|---|---|---|
| WO | WO-2007060523 A1 * | 5/2007 | ........ B01L 3/502723 |

OTHER PUBLICATIONS

Machine Translation for EP 32225309. Retrieved Sep. 9, 2022 (Year: 2022).*

(Continued)

*Primary Examiner* — Brian J. Sines
(74) *Attorney, Agent, or Firm* — Peter Suchecki

(57) ABSTRACT

According to a first aspect, the present invention is embodied as a method of processing a filtered liquid with a microfluidic device. The method includes positioning a porous filtering medium with respect to the microfluidic device, so as to allow a flow path between the filtering medium and a channel of the microfluidic device. The method further includes introducing a liquid in the porous filtering medium for the liquid to advance along the filtering medium and be filtered by the medium. The method further includes applying compression to the filtering medium to extract a given volume of the filtered liquid from the filtering medium, where the extracted liquid volume reaches said channel via the flow path. The method further includes processing the extracted volume with the microfluidic device.

18 Claims, 9 Drawing Sheets

(51) Int. Cl.
  *B01D 39/18* (2006.01)
  *B01D 29/03* (2006.01)
  *G01N 1/10* (2006.01)
  *B01L 3/00* (2006.01)

(52) U.S. Cl.
  CPC ........ *B01D 39/18* (2013.01); *B01L 3/502761* (2013.01); *G01N 1/10* (2013.01); *B01D 2201/202* (2013.01); *B01L 2200/0631* (2013.01); *B01L 2200/0652* (2013.01); *B01L 2300/0681* (2013.01); *B01L 2400/0406* (2013.01); *G01N 2001/4088* (2013.01)

(58) Field of Classification Search
  CPC .............. B01D 39/18; B01D 2201/202; B01D 39/2017; B01D 2239/0428; B01L 3/502761; B01L 2200/0631; B01L 2200/0652; B01L 2300/0681; B01L 2400/0406; B01L 2300/021; B01L 2300/069; B01L 2300/0816; B01L 2300/0877; B01L 2300/0887; B01L 2300/126; B01L 2400/0481; B01L 3/50273
  See application file for complete search history.

(56) References Cited

U.S. PATENT DOCUMENTS

| | | | |
|---|---|---|---|
| 2015/0090674 A1* | 4/2015 | Lee | A61B 5/6866 210/806 |
| 2018/0193834 A1 | 7/2018 | Mauk | |
| 2018/0345288 A1 | 12/2018 | Belotserkovsky | |
| 2019/0091687 A1* | 3/2019 | Alhasnani | B01L 3/50273 |
| 2019/0184393 A1 | 6/2019 | Mahmud | |

OTHER PUBLICATIONS

"DICHTOL, Capillary sealer", Diamant—The Metalplastic Company, downloaded from the Internet on Jun. 11, 2020, 4 pps.
"DICHTOL, Material Data Sheet", Diamant—The Metalplastic Company, downloaded from the Internet on Jun. 11, 2020, 2 pps.
Dimov et al. "Stand-alone self-powered integrated microfluidic blood analysis system (SIMBAS)", Sep. 12, 2010, Lab on a Chip, 2011, 11 pps.
Homsy et al., "Development and validation of a low cost blood filtration element separating plasma from undiluted whole blood", 9 pps., Biomicrofluidics 6, 012804 (2012).
"Helping you build a smarter diagnostic assay", GE Healthcare Bio-Sciences Corp., 32 pps., <https://www.gelifesciences.com/en/ch/shop/whatman-laboratory-filtration/whatman-dx-components/lateral-flow-pads/lf1-p-00788#tech-spec-table>.
Minnella, "Microfluidic cell separation and sorting: a short review", Elveflow, 4 pps., downloaded from the Internet on Jun. 11, 2020, <http://www.elveflow.com/microfluidic-tutorials/cell-biology-imaging-reviews-and-tutorials/microfluidic-for-cell-biology/label-free-microfluidic-cell-separation-and-sorting-techniques-a-review/>.
Son et al., "Hemolysis-free blood plasma separation", © The Royal Society of Chemistry 2014, Lab Chip, 2014, 14, 2287-2292.

* cited by examiner

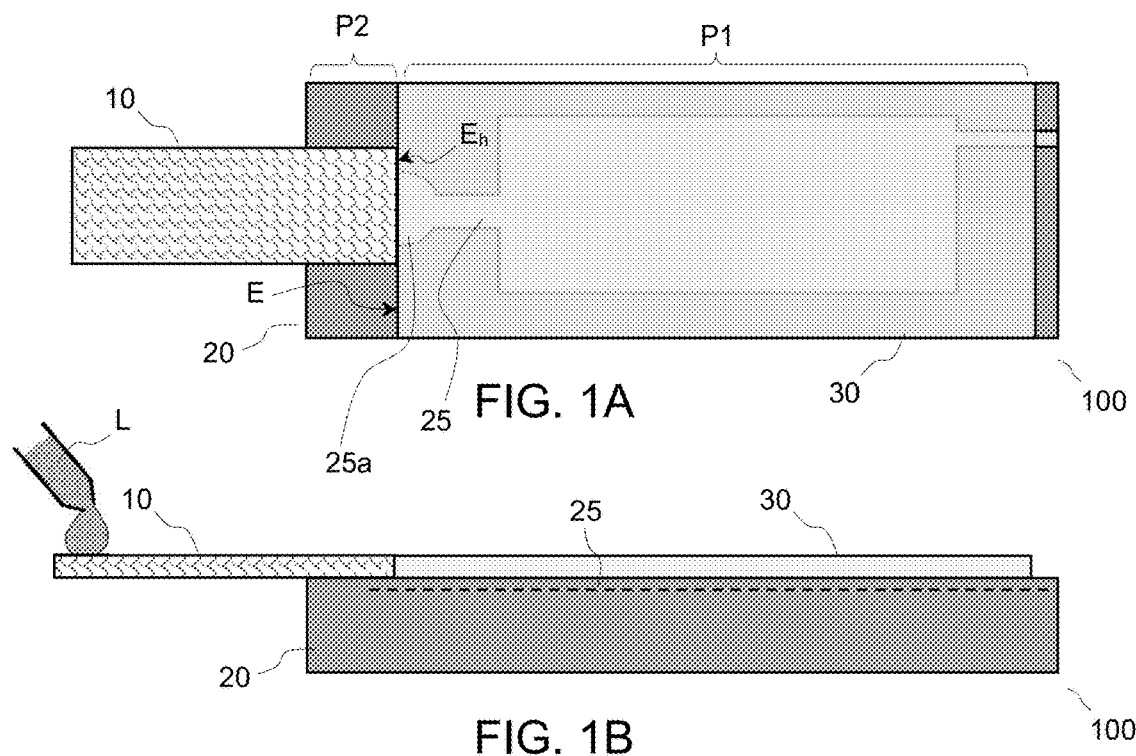
FIG. 1A
FIG. 1B
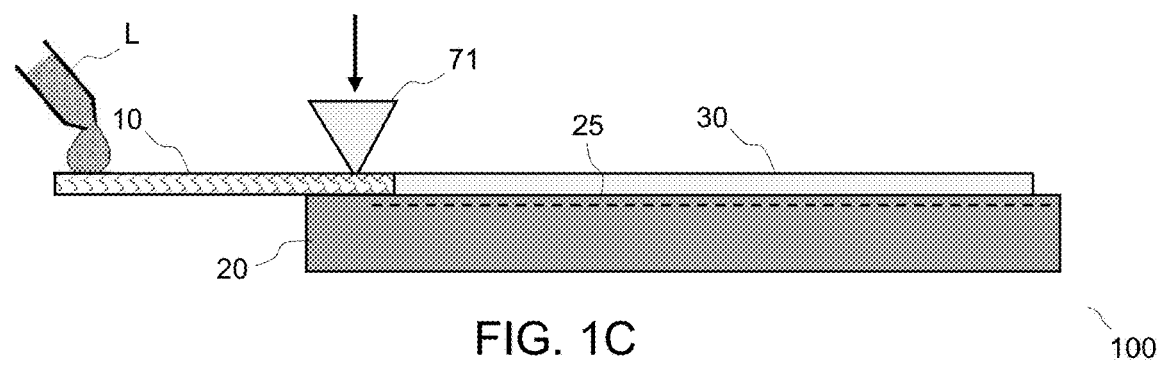
FIG. 1C
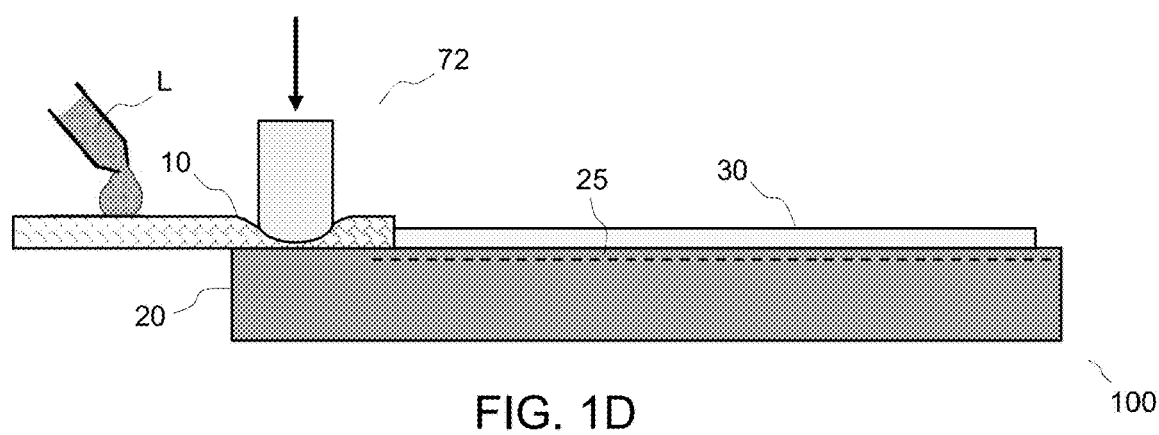
FIG. 1D

BRIDGING LIQUID BETWEEN MICROFLUIDIC ELEMENTS WITHOUT CLOSED CHANNELS

STATEMENT REGARDING OTHER (NON-US) SPONSORED WORK

The project leading to this application has received funding from the European Union's Horizon 2020 research and innovation programme under grant agreement No 764476.

BACKGROUND OF THE INVENTION

The present invention relates generally to the field of microfluidic elements (e.g., microfluidic chips), and more particularly to methods of processing a filtered liquid with a microfluidic.

Microfluidics deals with the precise control and manipulation of small volumes of fluids. Typically, such volumes are in the sub-milliliter range and are constrained to micrometer-length scale channels. Prominent features of microfluidics originate from the peculiar behavior that liquids exhibit at the micrometer length scale. Flow of liquids in microfluidics is typically laminar. Volumes well below one nanoliter can be reached by fabricating structures with lateral dimensions in the micrometer range. Microfluidic devices generally refer to microfabricated devices, which are used for pumping, sampling, mixing, analyzing, and dosing liquids.

Many microfluidic devices have user chip interfaces and closed flow paths. Closed flow paths are usually desired to facilitate the integration of functional elements (e.g., heaters, mixers, pumps, sensors, valves, etc.) into one device while minimizing problems related to leaks and evaporation. The analysis of liquid samples often requires a series of steps (e.g., filtration, dissolution of reagents, heating, washing, reading of signal, etc.). Metallic electrodes are sometimes patterned in channels of the device.

Microfluidics has opened the door for applications in many areas of healthcare and life sciences, such as point-of-care diagnostics (POCDs), environmental analysis, and drug discovery. POCDs strongly benefit from microfluidic technologies due to the miniaturization of tests, which enhances portability and the integration of various functions into one diagnostic device. For instance, many lateral flow assay tests rely on microfluidic functions and microfabrication to increase their precision and multiplexing capabilities.

SUMMARY

According to a first aspect, the present invention is embodied as a method of processing a filtered liquid with a microfluidic device. The method includes positioning a porous filtering medium with respect to the microfluidic device, so as to allow a flow path between the filtering medium and a channel of the microfluidic device. The method further includes introducing a liquid in the porous filtering medium for the liquid to advance along the filtering medium and be filtered by the medium. The method further includes applying compression to the filtering medium to extract a given volume of the filtered liquid from the filtering medium, where the extracted liquid volume reaches said channel via the flow path. The method further includes processing the extracted volume with the microfluidic device.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with embodiments of the present disclosure. FIGS. 1, 3, 5, 6D, and 7-9 depict preferred configurations of a liquid-guiding element (including or consisting of a porous filtering medium) and a microfluidic device, which possibly involve a holder, where a liquid flow from the filtering medium is bridged to the microfluidic device.

FIG. 1A depicts a top view of a first configuration, in which the filtering medium contacts a substrate of the microfluidic device (here a microfluidic chip) and abuts a cover layer of the chip, in accordance with embodiments of the present invention.

FIG. 1B depicts a side view corresponding to the configuration of FIG. 1, in accordance with embodiments of the present invention.

FIG. 1C depicts a side view corresponding to the configuration of FIG. 1, illustrating how the filtering medium can be locally clamped to allow good contact between the filtering medium and a loading pad of the microfluidic chip, in accordance with embodiments of the present invention.

FIG. 1D depicts a side view corresponding to the configuration of FIG. 1, illustrating how the filtering medium can be locally compressed to allow good contact between the filtering medium and a loading pad of the microfluidic chip, in accordance with embodiments of the present invention.

FIG. 6D schematically depicts a cross-sectional view of the chips of FIG. 6C and additionally illustrates how the chip of FIG. 6C can be placed in a cavity of the holder, whereby extracted liquid accumulates in the cavity prior to entering a channel of the chip, in accordance with embodiments of the present invention.

Figure 2A:
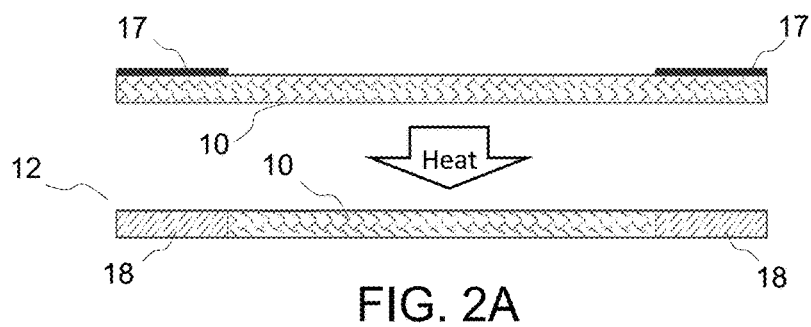
FIG. 2A illustrates a cross-sectional view of a fabrication process of liquid-guiding elements, where lateral liquid-guiding barriers are added to the filtering medium, in accordance with embodiments of the present invention.
Figure 2B:
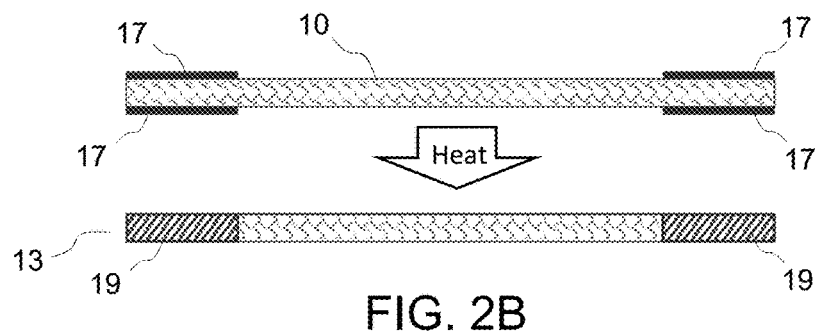
FIG. 2B illustrates a cross-sectional view of a fabrication process of liquid-guiding elements, where lateral liquid-guiding barriers are added to the filtering medium, in accordance with embodiments of the present invention.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

Embodiments of the present invention recognize that several applications of microfluidic devices consist in processing a liquid with the microfluidic device (e.g., a diagnostic device), where the liquid is first filtered. For example, cells in body fluids are typically filtered out prior to processing the filtrate on a diagnostic device. However, embodiments of the present invention recognize difficulty, in practice, of using a filtering medium such as a cell filtration paper and bridge the filtrate to the microfluidic device.

In various examples, an application of particular importance concerns the filtration of red blood cells (RBCs) from blood to perform a diagnostic test. RBCs can prevent a satisfactory detection of a range of biomarkers directly from a sample of blood. Also, the presence of RBCs creates variability of the biomarker signal. Moreover, nucleic acids and other cellular components can be released from RBCs, which can hinder the detection and measurements of circulating extracellular markers.

Further, embodiments of the present invention recognize the importance of removing RBCs from a sample of blood to prevent hemolysis and improve the detection of circulating tumor cells (ctDNA) and fetal nucleic acid. Note, hemoglobin is released by hemolysis, which might be an issue during the preanalytical phase. Proteins (e.g., cTnI) and metabolites concentrations (potassium, lactate dehydrogenase, and aspartate aminotransferase) are affected by hemolysis.

Embodiments of the present invention recognize that the above issues can severely affect the outcome of the diagnostic. Various approaches are known. A first class of approach consists in separating the filtration from the analysis; the sample is first filtered and then introduced in the diagnostic device. Another approach is to filter out RBCs directly on the microfluidic device (e.g., by exploiting structural features of microfluidic chip). However, filtering out the RBCs directly can add complexity in the fabrication process and reduce the footprint of the chip utilizable for the diagnostic test.

Several approaches to the plasma separation on microfluidic devices are known, such as based on degas-driven fluid flows or sedimentation. In general, embodiments of the present invention recognize that the proposed set-ups either impose severe constraints on the timing of operations, or involve complex peripherals and architectures, and/or a complex fabrication process.

In reference to FIGS. 1, 3, 5, 6D, and 7-9, an aspect of the invention is first described, which concerns a method of processing a filtered liquid with a microfluidic device. Note, the present method and respective variants are collectively referred to as the "present methods."

Such methods make use of a microfluidic device 100 and a filtering medium 10 (e.g., a porous filtering medium), which may possibly form part of a liquid-guiding elements, as in embodiments discussed later. In example embodiments, the filtering medium 10 is first positioned with respect to the microfluidic device 100, in a configuration that enables a flow path between the filtering medium and one or more instances of channel 25 of the microfluidic device 100 (in the following, also referred to as a single instance of channel 25 of the microfluidic device, for simplicity). However, additional embodiments and principles disclosed herein may be leveraged to bridge liquid flows to several channel inlets and each instance of channel 25 may further lead to junctions, connecting the channel to two or more channels, as usual in the art.

A liquid "L" is introduced in the filtering medium 10, so as for the liquid L to advance along the medium and be filtered by filtering medium 10. Next, compression is applied to the filtering medium 10, so as to extract a given volume "V" of the filtered liquid from the medium. The volume of extracted liquid may be more less well defined, depending on the filtering medium 10 (or the liquid-guiding element), and the compression means used. Applying compression to the porous filtering medium is also useful for holding the medium 10 in place and allowing good contact with the microfluidic device 100. Note, independently from the compression applied, the filtering medium 10 may possibly be clamped or fixed to the microfluidic device 100, (i.e., using other clamping or fixing means).

As a result of the applied compression, the extracted liquid volume V reaches the channel 25 of the microfluidic device 100, thanks to the flow path enabled by the configuration. Note, the flow path does not necessarily need to be formed on one or more surfaces (though the flow path is bounded by one or more surfaces of the components involved); the flow path can notably be an aerial flow path, as discussed later in detail.

Finally, the extracted volume V is processed using the microfluidic device 100. In various example embodiments, microfluidic device 100 can enable any suitable processing technique, such as techniques based on a simple chemical reaction with reagents on the channel 25 (or another channel or a chamber communicating therewith), optical signals detected from the liquid flow advancing in the microfluidic device 100, and/or on signals measured via electrodes arranged across or along the channel 25. Such microfluidic processing techniques are known per se and may possibly be combined for the present purpose.

In example embodiments, the microfluidic device 100 is designed as microfluidic chip (e.g., fabricated in silicon or injection molded) and, more specifically, as a capillary-driven microfluidic chip, such that active pumping means are not necessarily needed.

In other example embodiments, the microfluidic device may also be a paper-based microfluidic element or a sampling element. For example, such a device may be formed by combining various layers of wicking media (fibrous/porous media) to form the flow paths. The boundaries of the flow paths may for instance be formed by a hydrophobic material, such as wax (e.g., the flow paths may be wax-printed). Namely, the input and output channels, the node cavities and inlet ports are defined on an upper layer, whereas distribution channels are defined on the lower layer.

Compression can be achieved by various different means. For example, by rolling a compression roller 74 or by pressing the filtering medium 10 with any suitable compression means, including one or more compression elements, having any suitable shape (e.g., flat, rounded, etc.) (i.e., compare FIGS. 1C, 1D, and 3B). Various embodiments can desire to use multiple compression elements, the actuation of which may further need be synchronized (such elements may press the filtering medium 10 at different times) to optimize the liquid extraction.

The filtering medium 10 is preferably a microfluidic paper element, such as a wicking filtering medium (consisting of a fibrous/porous medium such as paper or a nitro-cellulosic material). More generally, any bibulous material can be contemplated. The filtering medium filters out particles (e.g., minute particles) of the introduced liquid L. The filtering medium may notably be designed to filter out any dust particle, impurities, or any components (e.g., corpuscles) of the introduced liquid L, such as red blood cells (RBCs), as in preferred applications.

In such application, one may for example use paper filter such as the LF1 filter paper from Whatman®. More generally, embodiments of the present invention can also utilize other types of filters, starting with filter papers such as bound glass fiber filters, which happen to provide satisfactory results for whole blood samples (even a single drop) or serum samples. Such paper filters allow a relatively fast volume separation rate (the separation is achieved within a few dozens of seconds, or a few minutes) and can be used for lateral-flow assays. Furthermore, the paper filters do not lead to appreciable red cell hemolysis and allow for some flexibility in the design of the configuration, as illustrated in FIGS. 1, 3, and 5-7.

Embodiments of the present invention provide an approach for bridging a liquid flow between pairs of microfluidic elements, which does not require any closed-channel system. In such embodiments, the flow path enabled by the configuration of the filtering medium and the microfluidic device can therefore be an open flow path, which does not necessarily need to be formed on a surface. Still, the flow path is bounded by one or more surfaces of the filtering medium 10, the microfluidic device 100, and possibly a holder, as involved in further embodiments.

Accordingly, various embodiments can advantageously apply the approach to blood filtration, where the first microfluidic elements may for instance be a lateral flow filter paper and the second element (e.g., element 52) be a capillary-driven microfluidic chip (as in some embodiments discussed below). In additional embodiments, however, the proposed approach provides solutions for numerous microfluidic applications, in particular where liquids need to be transferred without closed channels.

Various embodiments can indeed be contemplated. For example, the proposed approach can bridge liquids between a paper strip and a microfluidic chip, which prevents the paper strip from detaching from the microfluidic chip, as illustrated in FIGS. 1-3. That is, the compression applied prevents the filtering medium 10 from bending or lifting when filtering medium 10 gets wetted by the introduced liquid. The compression means may possibly be complemented by clamping means and/or fixing means. If necessary, lateral barriers can be used for guiding liquid along the filtering medium (see FIGS. 2-5, and 9), in which barriers prevent liquid to creep at the edges of the filtering medium 10 or to overflow. In additional embodiments, the filtering medium can be sealed on top and bottom using cover layers (see FIG. 2-4) to facilitate dispensing of precise amounts of liquid from the filtering medium.

Figure 6A:
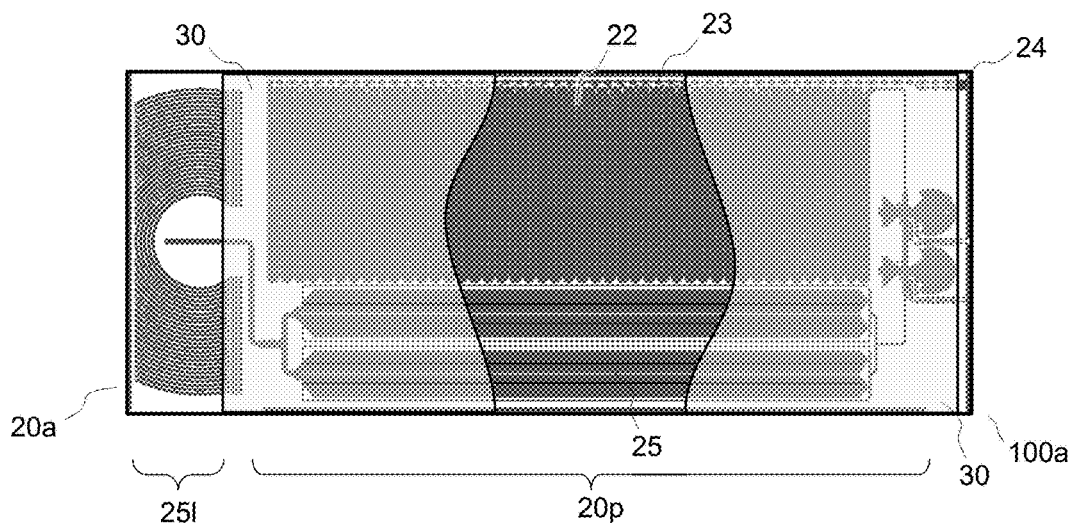
FIG. 6A illustrates a realistic, top view of a microfluidic chip comprising a loading pad, in accordance with embodiments of the present invention.
Figure 6B:
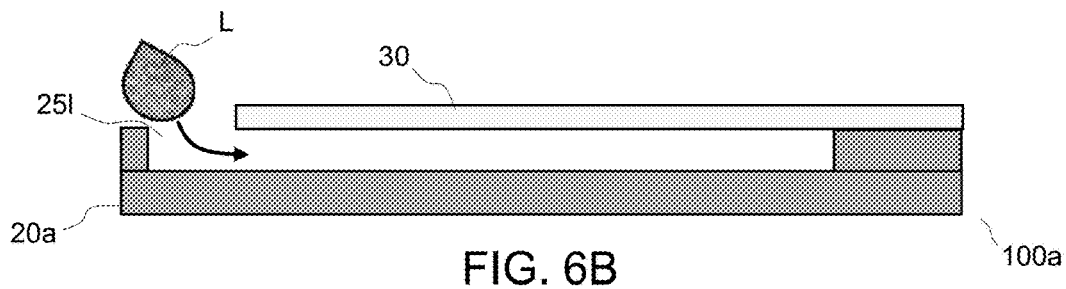
FIG. 6B schematically depicts a cross-sectional view of the chips of FIG. 6A, in accordance with embodiments of the present invention.
Figure 6C:
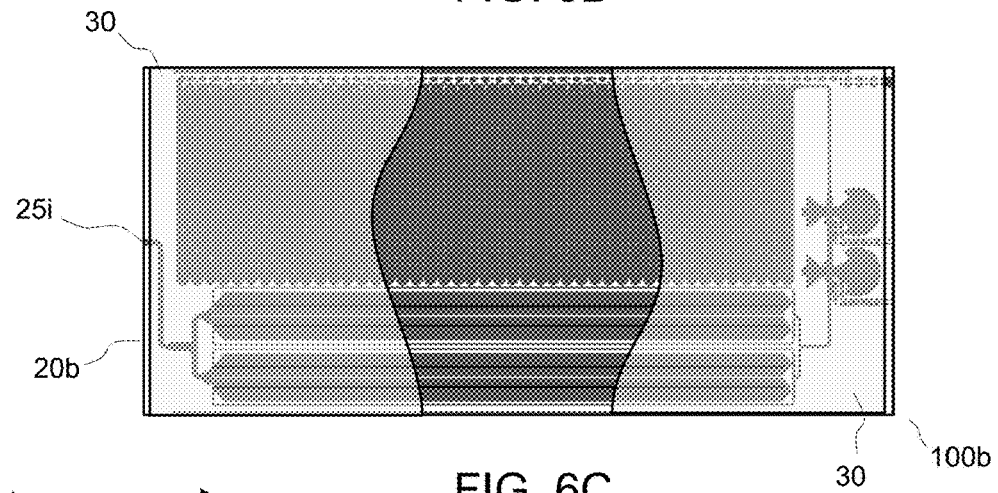
FIG. 6C illustrates a realistic, top view of a microfluidic chip where the inlet (aperture) to the channel is provided on an edge surface of the chip, in accordance with embodiments of the present invention.

The microfluidic device 100 may be a microfluidic chip that is free of any loading pad (compare FIGS. 6A and 6C). In this case, liquid is directly brought to one or more instances of channel 25 of the chip, which have an aperture opened on a lateral edge of the chip. In various embodiments, a fully-integrated (filtration and capillary-driven chip) system is used to filter RBCs from blood for capillary-driven microfluidics (FIGS. 7-8). A holder (i.e., holder 41, holder 42, holder 43, and/or holder 44) or holder 50 (e.g., a cartridge) may advantageously be used to connect the filtering medium 10 and microfluidic device 100. In example embodiments, using a suitably shaped holder 44 allows multiple chips (e.g., instances of microfluidic device 100) to be sequentially bridged (FIG. 9).

Some embodiments operate to perform applications requiring blood filtration. However, additional embodiments do not restrict to such applications, as noted earlier.

To start with, the microfluidic device 100 can be a microfluidic chip, including microfluidic channels fabricated as conduits or grooves. The microfluidic channels (also referred to as channels, or microchannels) are preferably formed as grooves on a main surface of a (thick) layer of the device. For example, the layer is a substrate, or any layer that is sufficiently thick to provide sufficient mechanical stability for the channel. The mechanical stability of the whole device can be ensured by an additional layer underneath (i.e., supporting the structured layer). The layer on which the microstructures are patterned will typically be an essentially planar object, such as a chip, a wafer or any such planar support.

Beyond microchannels, the layer may include various structures formed thereon or therein, in particular microstructures and other microfluidic features, such as capillary pumps, loading pads, anti-wetting structures, valves, flow resistors, vents, as well as electrodes, electric circuits, and contact pads, as fairly usual in the field. For instance, FIG. 6A shows a device involving a loading area 25*l* leading to a channel and then to a junction splitting the channel into several processing channels in fluidic communication with: a capillary pump 22, which is connected to passive, fluid flow constriction valves 23, and then to a vent 24; as well as other microstructures, such as liquid pinning structures, and vias.

The flow path structure is typically covered (sealed) by a light-permissive cover layer 30, or lid, for detection/monitoring purposes. For example, cover layer 30 can be obtained by laminating a polymeric film, as known in the art.

Preferably, a characteristic depth of the present channels, chambers, vents and other structures is in the micrometer-length range, i.e., between 1 μm and 200 μm (and more preferably between 10 μm and 100 μm). Yet, some particular structures of the present devices may be in the nanoscale range or in the millimeter range. The devices as a whole are typically in the centimeter range. Widths (e.g., as measured in-plane) for the channels and vents can also typically be in the micrometer-length range. The channel width is measured in-plane and perpendicularly to the direction of propagation of liquid in the channel. The width of the channel can normally be substantially be smaller than the average diameter of chambers communicating therewith, if any.

The above dimensions typically apply to chips (i.e., devices whose core chips are typically fabricated in silicon), although other materials can be used, such as glass, a metal wafer, or polydimethylsiloxane (PDMS); a microfluidic chip can also be injection molded.

In variants, the microfluidic device may be fabricated based on wicking media, the dimensions of which typically differ. For example, wax-printed devices are preferably dimensioned as follows. The minimal (in-plane) width of wax-printed, lateral channel walls may be on the order of 300 μm (as after printing), and 850 μm (after heat treatment, due to the wax spreading). The depth is determined by the thickness of the wicking media (typically larger than 100 μm). For example, the channel width (i.e., the in-plane separation between the wax-printed, lateral walls) may be between 100 μm and 1 000 μm, with a typical 50 μm standard deviation, after heat treatment. Chambers communicating with the channels may typically be wider.

Figure 5A:
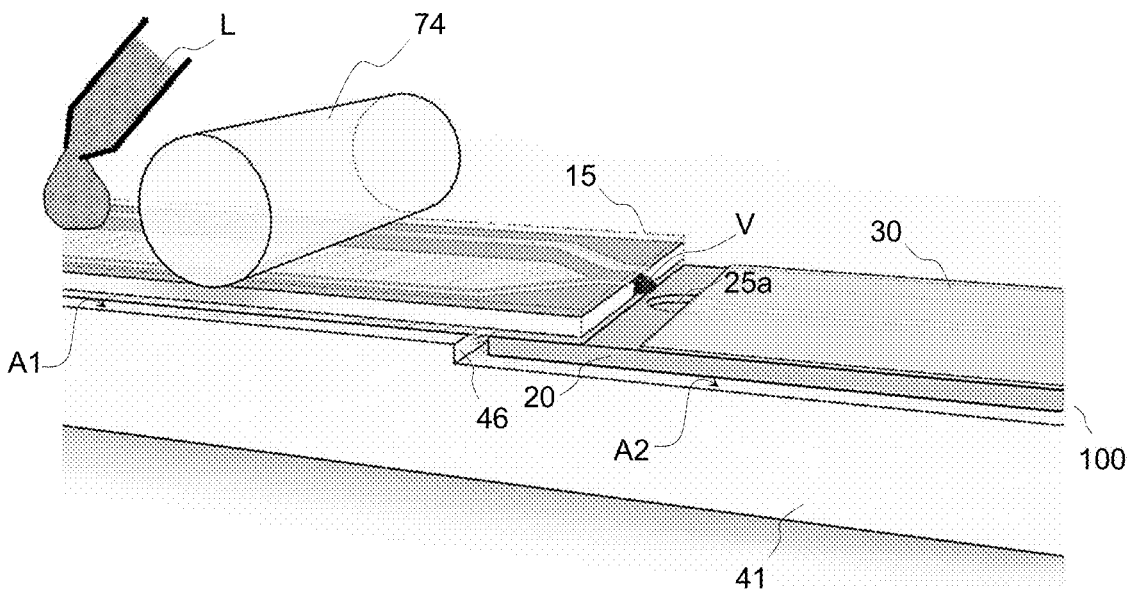
FIG. 5A illustrates a 3D view of a bridging configuration that additionally involves a holder to place and maintain the microfluidic device and the filtering medium, in accordance with embodiments of the present invention.

Referring now to FIGS. 1 and 3, the porous filtering medium 10 is preferably positioned so as to contact a holder 41, 42, 44, 50 (see FIGS. 5, 6D, and 7-9) and/or the microfluidic device 100 (see FIGS. 1, 3, and 8). In one example embodiment, the filtering medium 10 is in physical contact with a microfluidic device (likely a microfluidic chip), without a holder being required (FIGS. 1 and 3). In another example embodiment, the filtering medium 10 is only in physical contact with the holder (FIGS. 6D, 7, and 9). In a further embodiment, the filtering medium 10 contacts both the holder 42, 50 and the paired microfluidic device 100 (FIGS. 5A, 8).

In the example of in FIG. 1 (i.e., FIG. 1A through FIG. 1D), the microfluidic device 100 comprises a substrate 20 (i.e., a material layer that is sufficiently thick to be structured so as to form said channel(s) (e.g., channel 25), which layer may further ensure mechanical stability of the device 100, as assumed in FIGS. 1B-1D). In addition, the microfluidic device 100 will likely comprise a cover layer 30, which covers a first portion 0 of the top surface of the structured substrate (e.g., substrate 20), see FIG. 1A.

In this example, the filtering medium 10 is positioned so as for a bottom surface of the filtering medium 10 to contact a second portion P2 of the top surface of the substrate 20. In addition, the head edge $E_h$ of the porous filtering medium 10 oppositely contacts the head edge E of the cover layer 30 (i.e., the head edges of the filtering medium 10 and the cover layer 30 are in face (or front) contact with each other). The two covered portions, first portion P1 and second portion P2, are thus contiguous portions of the substrate surface in that case, see FIG. 1A. In additional embodiments, substrate 20*a*, 20*b*, and 20*p* (depicted in FIGS. 6A-6D) are representative of an example substrate, or portion of a substrate, such as substrate 20.

For example, a paper filter (e.g., filtering medium 10) can be brought in direct contact with a microfluidic chip (e.g., microfluidic device 100), which comprises a silicon-based substrate (e.g., substrate 20) (FIG. 1A). Pressing the paper onto the microfluidic device 100 (see FIG. 1C) ensures proper contact of the paper with the aperture 25*a* or some inlet of the channel 25 in the first portion P1. For example, the filter paper (e.g., filtering medium 10) can be clamped or otherwise fixed onto the chip (e.g., microfluidic device 100), in order to allow a good bridging contact between the filter paper (e.g., filtering medium 10) and the chip (e.g., microfluidic device 100), as illustrated in FIG. 1C. Note, the filter paper will preferably be put in place and clamped (or otherwise fixed), if necessary, before introducing the liquid in the filter paper (e.g., filtering medium 10).

In the configuration shown in FIGS. 1A-1C, the cover layer 30 (e.g., a dry film) partly covers the aperture 25*a*, and the filter paper (e.g., filtering medium 10) is in contact with both the loading pad and the head edge "E" of the cover layer 30. In addition to clamping (or otherwise fixing) the paper filter, compression is applied to the paper with a compression element (e.g., compression element 71, compression element 72, etc.), in order to extract a defined amount of liquid from the paper filter and bridge the extracted liquid to the aperture 25*a* of the silicon-based substrate (e.g., substrate 20) of the microfluidic chip (e.g., microfluidic device 100), as assumed in FIG. 1D.

Various shapes can be contemplated for the pressing part(s) or the compression elements. For example, the pressing part may have a tapered or a rounded edge, as illustrated in FIGS. 1C and 1D. In variants, the porous filtering medium (e.g., filtering medium 10) can be pinched between two opposite compression elements (not shown). In other variants, the compression element may include several contact points. That is, several contact points (possibly with different geometries) may be used to improve the bridging of liquid. Note, clamping the filtering medium 10 with a bar-shaped contact point may possibly result in blocking the liquid flow. Conversely, a too small point-shaped contact may not be sufficient to allow the liquid to "jump" to the inlet (e.g., loading pad) of the chip (e.g., microfluidic device 100). Thus, one may want to use an array of tips or a contact part having a specifically defined shape, for example.

The examples depicted in FIGS. 3, 5, 7, and 9, make use of a compression roller 74. The filtering medium 10 is positioned such that at least a portion thereof contacts a surface of a mechanically stable support such as a holder 41-44, 50 or the substrate 20 of the microfluidic device 100. The filtering medium 10 is pressed by rolling the compression roller 74 onto the portion of the filtering medium 10 that contacts this support (see in particular FIGS. 3B, 5A, and 5B). Applying a mechanical force by rolling a rod-like element allows better-defined amounts of liquid to be dispensed from the filtering medium 10, especially when using a liquid-guiding device (e.g., one or more instances of elements 12-15), as described below in reference to FIGS. 2-4.

The filtering medium 10 may advantageously form part of a dedicated liquid-guiding element (e.g., element 12, element 13, element 14, and element 15), designed to optimize the liquid extraction. The liquid-guiding element concerns another aspect of the invention, which is further described in reference to FIGS. 2-4, and 9.

As best seen in FIGS. 2A-2D, the filtering medium 10 has a generally planar shape, which has a form factor. That is, the height of the filtering medium 10 is substantially smaller than the length of the filtering medium 10 and, preferably, also smaller than the width. In detail, the base of the shape is delimited by two opposite head edges $E_h$ and two opposite lateral (longitudinal) edges $E_l$. The head edges $E_h$ extend along the width of the base, while the lateral longitudinal edges $E_l$ extend along the length of the base, where the length corresponds to the direction of propagation of the liquid, in operation. The average height of the shape is substantially smaller than the length of the base, and preferably is substantially smaller than the width of the base as well, as depicted in the Figures.

The filtering medium 10 (e.g., a wicking medium) is generally designed to capillary pull liquid L along both the longitudinal direction (i.e., the direction of the length) of the medium 10. In addition, the liquid will also propagate along the direction of the width, which may cause the introduced liquid to creep at the lateral (longitudinal) edges or overflow. Creeping of liquid along the edges of the medium can lead to a malfunction as part of the liquid sample can potentially be lost by bypassing the intended flow path or the filtration process can become inefficient.

To prevent or mitigate such issues, two lateral liquid-guiding barriers (e.g., barriers 18 and 19) may be added to the filtering medium 10, to form a liquid-guiding element (e.g., one or more instances of elements 12-15). The lateral barriers extend, each, along a respective one of the longitudinal edges $E_l$, so as to laterally guide liquid L, which is capillary pulled in the filtering medium 10, along the longitudinal direction up to the head edge $E_h$ of the filtering medium 10 that is meant to face or overhang an inlet or a loading pad of the microfluidic device 100, in operation. Depending on the material used in fabrication, the barriers 18 and/or 19 can be made watertight, or may be somewhat porous, as discussed below. Adding such barriers to the medium yields a liquid-guiding element (e.g., one or more instances of elements 12-15) that provided the possibility to better channel the liquid and avoids wasting sample liquid.

The present liquid-guiding elements (i.e., elements 12-15) can advantageously be utilized to bridge a liquid flow to a microfluidic device 100. For example, by applying one or more instances of element 12-15 onto the microfluidic device 100, or by clamping or otherwise fixing an element onto the microfluidic device 100 (in order to allow a good bridging contact between the elements 12-15 and the microfluidic device 100, see FIG. 1C). In addition, the elements 12-15 may possibly be compressed using a compression element, in order to extract a defined amount of liquid from the elements 12-15 (as explained earlier).

The lateral barriers 18, 19 preferably extend, each, across the full height of the filtering medium 10. In example embodiments, the barriers may comprise a resin, wax, and/or dichtol (or another carbon tetrachloride-based material). Different fabrication processes can be contemplated to achieve the structure. For example, the barriers can be initially printed (e.g., as material 17) on one side of the filtering medium 10 (as assumed in FIG. 2A). Applying heat allows the printed material to diffuse across the medium, yielding lateral barriers (e.g., barrier 18) that extend across the full height of the filtering medium 10. In variants, the barrier material (e.g., material 17) may initially be printed on both sides of the filtering medium 10 (FIG. 2B), which normally ensures a more homogeneous diffusion of the material upon applying heat.

One may for instance generate suitable barriers by printing wax on a paper filter (e.g., material 17 on filtering medium 10). A standard printer may be used with "wax-like" ink to print barrier geometries. Heating the printed paper on a hot plate or with a laminator makes the ink penetrate the depth of the paper, thereby generating hydrophobic areas. As noted above, better performance is achieved using double-side printing or double-side transfer of the ink from printed transparency foils.

Using wax printing is a particularly easy way of fabricating barriers 18, 19. However, the barrier may remain somewhat porous. While the barrier will likely not be an issue for capillary-driven flows (as mostly contemplated herein), the barrier may cause leakage when actively pushing liquid through the filtering medium 10. One affordable way of achieving non-porous barriers in a filtering medium 10 is to define the barrier geometry using a resin or a liquid wax. Then, the paper of filtering medium 10 may be clamped between, for example, 3D printed template parts (e.g., template 31 and upper pressing block 32) to shield the flow path area (as illustrated in FIG. 4A-4D). By wicking the surrounding paper with liquid wax or another resin, well-defined and leak-free barriers can be achieved using the fabrication process.

Figure 4A:
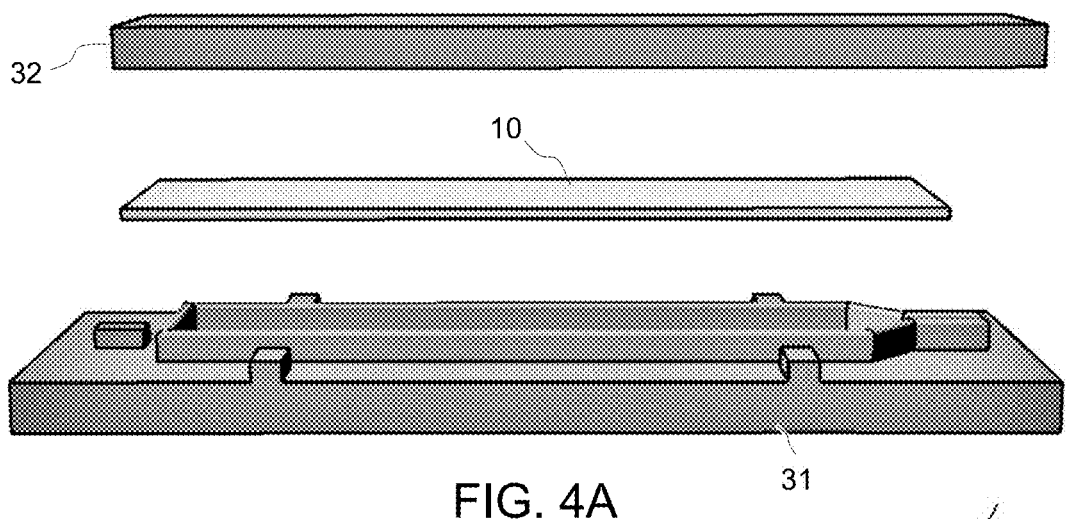
FIG. 4A illustrates a 3D view depicting a process of fabrication of a liquid-guiding element involving a 3D template, in accordance with embodiments of the present invention.
Figure 4B:
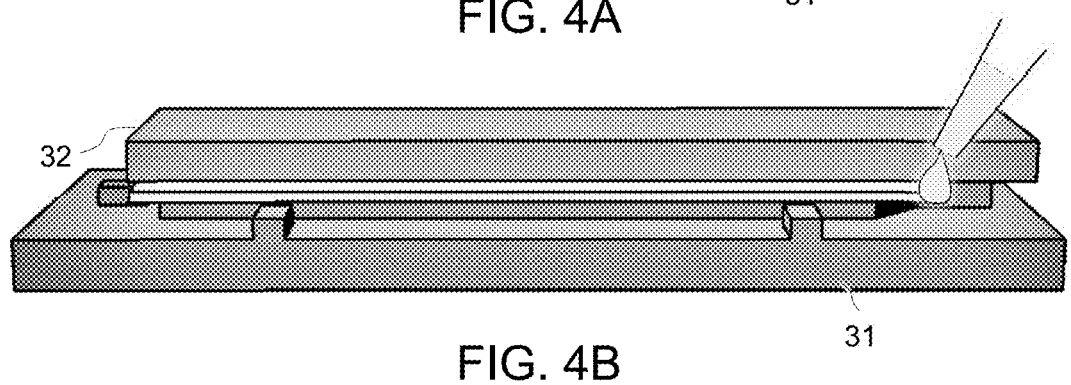
FIG. 4B illustrates a 3D view depicting a process of fabrication of a liquid-guiding element involving a 3D template, in accordance with embodiments of the present invention.
Figure 4C:
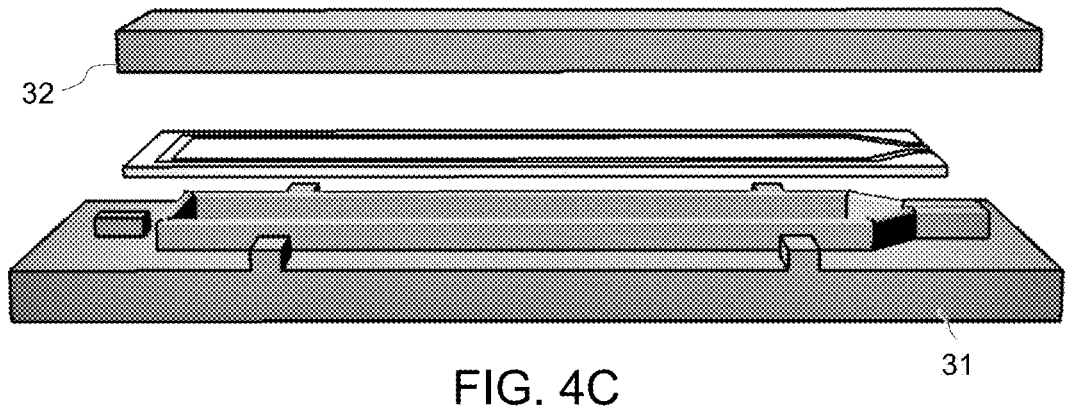
FIG. 4C illustrates a 3D view depicting a process of fabrication of a liquid-guiding element involving a 3D template, in accordance with embodiments of the present invention.
Figure 4D:
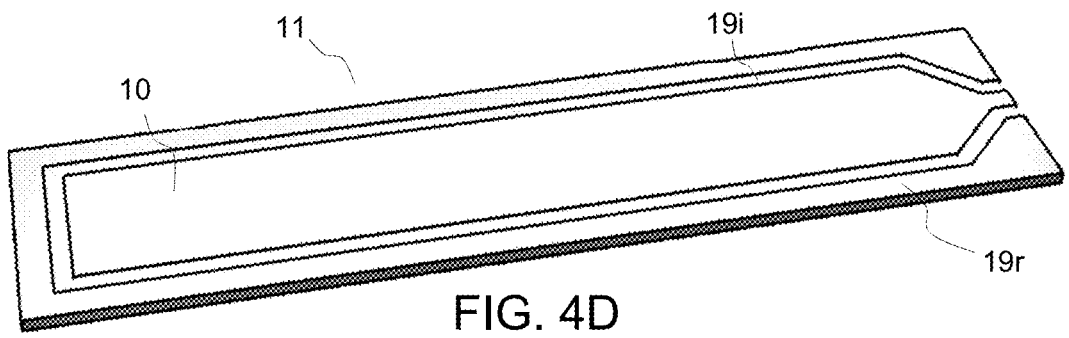
FIG. 4D illustrates a 3D view depicting a process of fabrication of a liquid-guiding element involving a 3D template, in accordance with embodiments of the present invention.

In detail, FIG. 4A shows an exploded view of the template 31 (i.e., a 3D template), the filtering medium 10 (e.g., filter paper), and an upper pressing block 32. The filtering medium 10 is clamped between the template 31 and upper pressing block 32, and resin is applied in the peripheral area of filtering medium 10 (FIG. 4B). The protruding fence of the 3D template (i.e., template 31) defines boundaries for the barriers. The filtering medium 10 (e.g., paper) is released after having cured the resin (FIG. 4C). As seen in FIG. 4D, the medium 11 eventually obtained shows a slight residual imprint (e.g., imprint 19*i*), due to the fence of the template 31. The barriers 19*r* are defined by the outer, peripheral region surrounding imprint 19*i*. The medium 11 obtained is thus functionally similar to the elements 12 and 13 of FIGS. 2A and 2B, although the barriers 19*r* will likely be less porous than the barriers 18, 19.

In other variants, dichtol can be used to fabricate the barriers. To test this, templates were 3D printed and a piece of brass was used as pressing block (not shown), as in FIG. 4. Dichtol was applied to form the barriers. A functional filter paper with dichtol barriers can be obtained after curing the dichtol (for approximately 1 hour).

When contacting a paper filter (e.g., filtering medium 10) with a capillary driven chip (e.g., microfluidic device 100, as in FIG. 1), a sufficient quantity of liquid sample needs to be brought to the chip. Bridging liquid works best when the filtering medium 10 is overfilled and hydrostatic pressure aids to the flow. Still, overfilling a paper filter can cause a malfunction of the paper filtration and thus need be handled with care. In that respect, one may use, in addition to lateral barriers (e.g., barriers 18,19, 19r), cover layers 16 covering the filtering medium 10 from the top and the bottom. The resulting elements 14 and 15 facilitates the possibility of dispensing precise amounts of filtrate (i.e., liquid filtered by the filtering medium 10). Beyond paper, other porous filtering media may similarly be laterally fenced and covered on top and bottom.

Figure 2C:
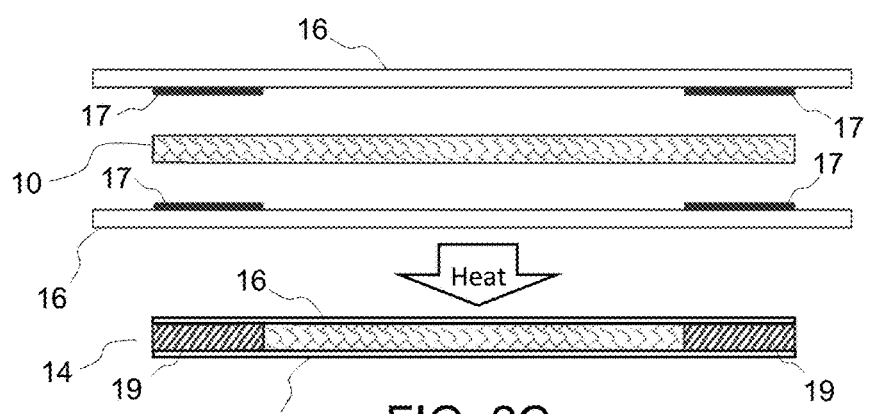
FIG. 2C illustrates a cross-sectional view of a fabrication process of liquid-guiding elements, where lateral liquid-guiding barriers are added to the filtering medium, in accordance with embodiments of the present invention.
Figure 2D:
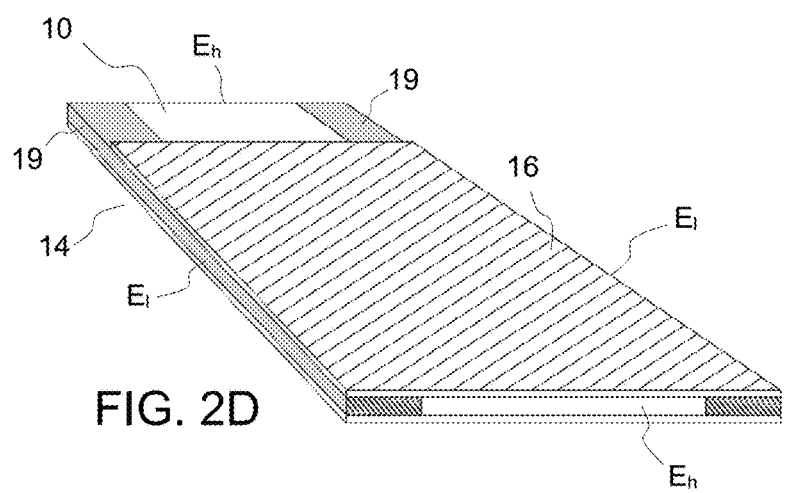
FIG. 2D illustrates a 3D view of a liquid-guiding element obtained according to the process depicted in FIG. 2C, where the resulting liquid-guiding element includes top and bottom cover layers, in addition to the lateral barriers, in accordance with embodiments of the present invention.
Figure 3A:
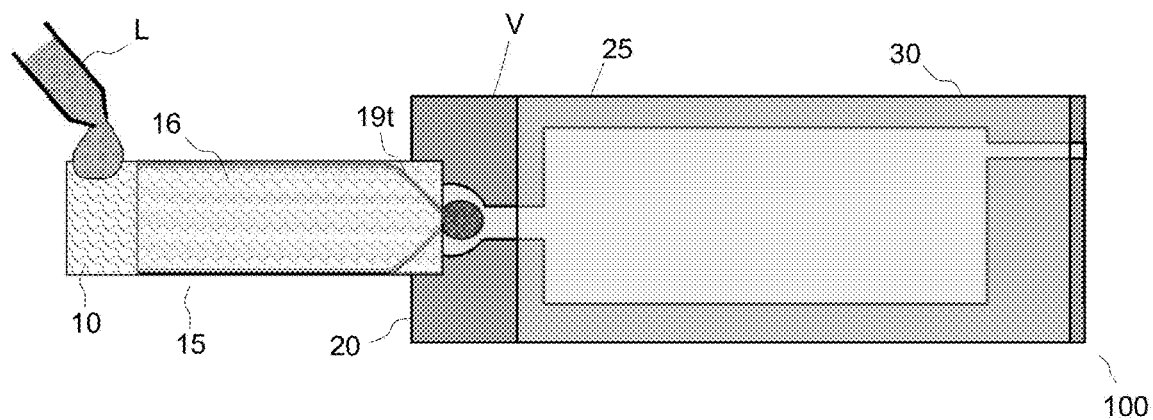
FIG. 3A depicts a top view of another bridging configuration involving a liquid-guiding element similar to that of FIG. 2D, except that the lateral barriers are tapered, in accordance with embodiments of the present invention.
Figure 3B:
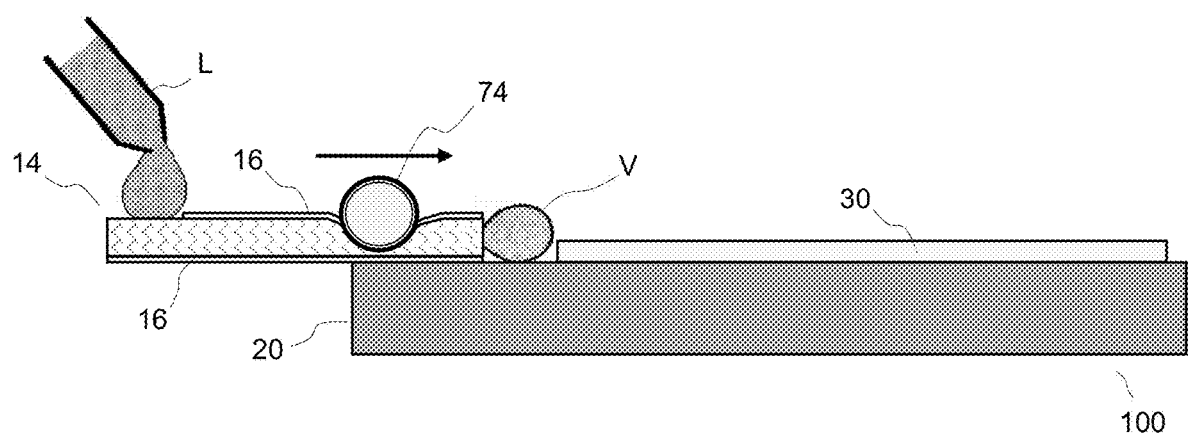
FIG. 3B depicts a side view illustrating application of compression to the liquid-guiding element of FIG. 2D or FIG. 3A, using a roller, to extract a well-defined amount of liquid, in accordance with embodiments of the present invention.

Accordingly, and as depicted in FIGS. 2D, 3A, 5A and 5B, the liquid-guiding element (e.g., elements 14 and 15) may comprise two coatings (e.g., cover layers 16) sealing opposite surfaces (the main surfaces) of the filtering medium 10. The coatings (or cover layers 16) are typically made of thin layer of watertight material. The coating may for instance be a laminate, a tape, or a wax print, and may notably be fabricated as shown in FIG. 2C. In example embodiments, the barrier material (e.g., material 17) is initially printed on the cover layers 16, before applying the printed cover layers 16 onto the filtering medium 10, so as for the printed material 17 (e.g., wax) to come in contact with the filtering medium 10. Upon applying heat while pressing the cover layers 16, the printed material 17 diffuses, which not only creates the desired barriers 19 but, in addition, fixes the cover layers 16 onto the filtering medium 10. Applying a mechanical force (e.g., using a rod-like pressure part) onto an element 14 (such as depicted in FIG. 2D) allows well-defined amounts of liquid to be dispensed from the filtering medium 10, in operation.

Example embodiments can utilize a blood filtration paper with wax-printed side barriers, which is covered on the top and bottom with a sticky tape. In an example scenario, after loading the paper with a colored liquid, droplets of the liquids were dispensed from the paper by rolling a 6 mm polytetrafluoroethylene rod over the paper filter toward an exit defined by tapered side barriers, yielding very satisfactory results, without wasting any liquid sample. Other materials can be contemplated for the rod.

As seen in FIGS. 3, 4, 5, and 9, the lateral barriers are preferably tapered. That is, a minimal distance between the two lateral barriers diminishes towards a head edge $E_h$ (see, e.g., the tapers denoted by reference 19t in FIG. 3A). The tapering allows to "focus" the liquid extracted at the head edge of the filtering medium 10, whereby the liquid can be more easily directed to a given channel inlet (or loading pad), without wasting liquid, in operation.

Liquid-guiding elements (e.g., elements 12-15 such has depicted in FIGS. 2-5 and 9) are advantageously used in the present methods. To that aim, a liquid-guiding element (e.g., one of elements 12-15) is brought in contact with the holder 41-44, 50 and/or the microfluidic device 100. After having introduced the liquid L in the filtering medium 10, the liquid L is capillary pulled in the filtering medium 10 and laterally guided by the liquid-guiding barriers (e.g., barriers 18, 19, 19r) up to the head edge $E_h$ of the filtering medium 10 facing or overhanging the microfluidic device 100.

As discussed, the liquid-guiding element (e.g., elements 14 and 15) cam preferably comprises coatings (e.g., cover layers 16) that seal opposite surfaces of the filtering medium 10, which allows the liquid sample to be confined vertically, in addition to being confined laterally thanks to the lateral barriers (e.g., barriers 18, 19, 19r). Thus, compression can be more serviceably applied. A particularly efficient and precise method is to apply compression by rolling a compression roller 74 on the element (e.g., an instance of element 14 and/or 15) placed on a support surface.

FIGS. 5, 6D, and 7-9 illustrate embodiments involving a holder 41-44, 50, which is designed so as to allow a bridging flow path. Both the filtering medium 10 (e.g., a porous filtering medium) and the microfluidic device 100, microfluidic device 100a, and microfluidic device 100b are positioned (i.e., placed) so as to contact respective areas on the holder 41-44, 50, prior to introducing the liquid L in the filtering medium 10. The holder 41-44, 50 is preferably structured so as to define distinct, flat areas A1, A2. The filtering medium 10 and the microfluidic device are positioned in respective ones of the areas A1 and A2, and are maintained in said areas A1, A2 while applying compression to the filtering medium 10. Said areas A1, A2 are preferably formed within compartments or cavities (e.g., as open cavities, which partly surrounds the respective filtering medium 10, medium 11, elements 12-15, and microfluidic device 100, 100a, 100b on one or more lateral sides thereof. The microfluidic device 100b may possibly be fixed on a respective area A2 (e.g., using any suitable adhesive 28, as depicted in FIGS. 6D and 7A).

A particularly simple solution is to design the holder to exhibit a step-like (or staircase-like) cross-section, as depicted in in FIGS. 3, 5, 6D, 7, and 9. That is, the holder 41-44, 50 has a riser 46 separating the two areas A1, A2 meant to receive the filtering medium 10 (or the guiding element, such as elements 14 and 15) and the microfluidic device 100, 100b. The riser 46 delimits the flow path (i.e., forms a vertical gap between the two areas A1, A2). The riser 46 may possibly form a flow path surface, assuming the riser 46 is wetting for the liquid sample considered. In preferred variants, however, the riser 46 merely delimits an aerial flow path made up by the gap (the riser may thus be non-wetting), as in FIGS. 3B and 9, or just make up a step for a portion of the liquid-guiding element to come in contact with an underlying portion of the microfluidic chip (FIG. 3A, 8A).

Several approaches can be contemplated. For example, one may extract liquid to accumulate in a cavity of the holder, prior to entering the channel of the microfluidic device (as in FIG. 7A). One may also let extracted liquid volumes fall onto (or somehow reach) the liquid loading pad of the microfluidic device (as in FIGS. 5A and 5B, using an overhanging configuration). Furthermore, the configuration of the liquid-guiding element, the holder, and the chip, may allow the extracted liquid to directly wet an edge channel inlet of the microfluidic chip (FIG. 6). Such approaches are now discussed in detail.

Figure 5B:
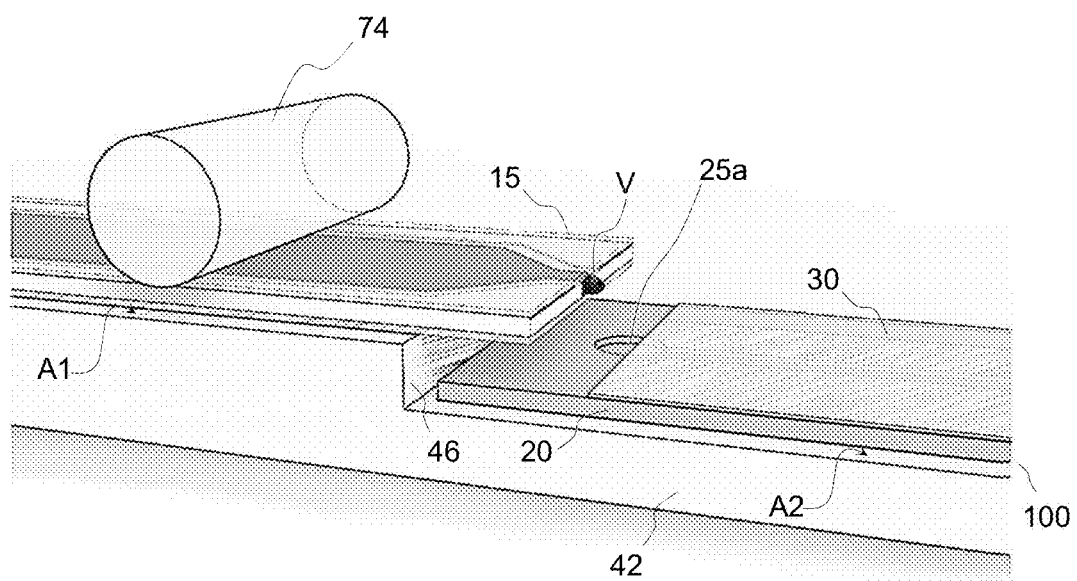
FIG. 5B illustrates a 3D view of a bridging configuration that additionally involves a holder to place and maintain the microfluidic device and the filtering medium, in accordance with embodiments of the present invention.
Figure 6D:
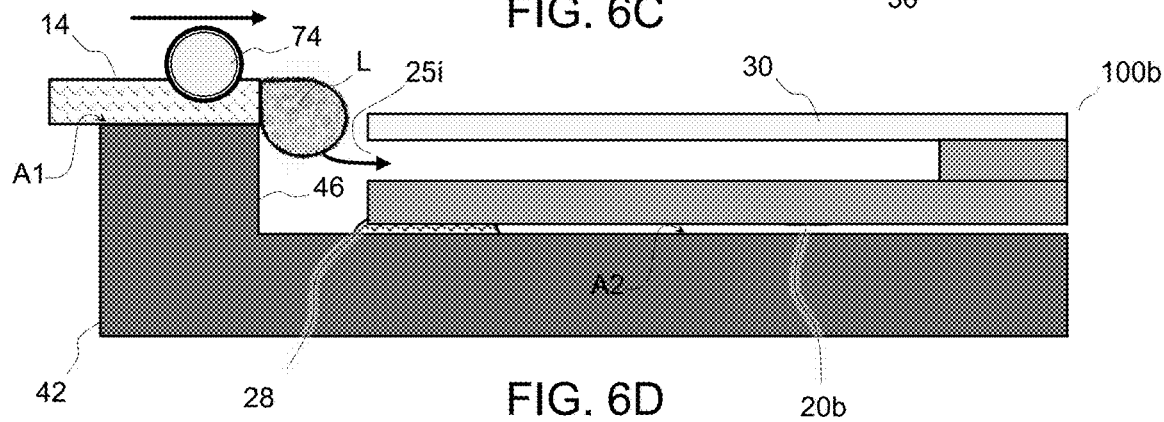

In the examples of FIGS. 5A and 5B, the liquid-guiding element (i.e., element 15) overhangs the upper edge of the riser 46. In FIG. 5A, element 15 is in direct contact with the microfluidic device 100, whereas a gap is provided in the configuration of FIG. 5B. In more detail, the channel 25 of the microfluidic device 100 has a liquid loading area (an aperture 25a) open on top (similar to the microfluidic device 100 of FIG. 1 or the microfluidic device 100a of FIG. 6A).

In the configuration of FIG. 5A, the riser is dimensioned so as for the overhanging portion of the liquid-guiding element (i.e., element 15) to rest on (and thus contact) the portion of the substrate 20 underneath. In that case, the extracted liquid volume V may reach the aperture 25a of the channel 25 by wetting the upper surface of the substrate 20. In the configuration of FIG. 5B, the riser 46 is made larger, so as to provide a residual gap between the overhanging portion of the liquid-guiding element (i.e., element 15) and the portion of the substrate 20 underneath. In that case, the extracted liquid volume V may reach the aperture 25*a* of the channel 25 by simply falling onto the aperture and/or the channel, once the liquid volume V has reached a sufficient mass to detach from the head edge of the liquid-guiding element (i.e., element 15).

Figure 7A:
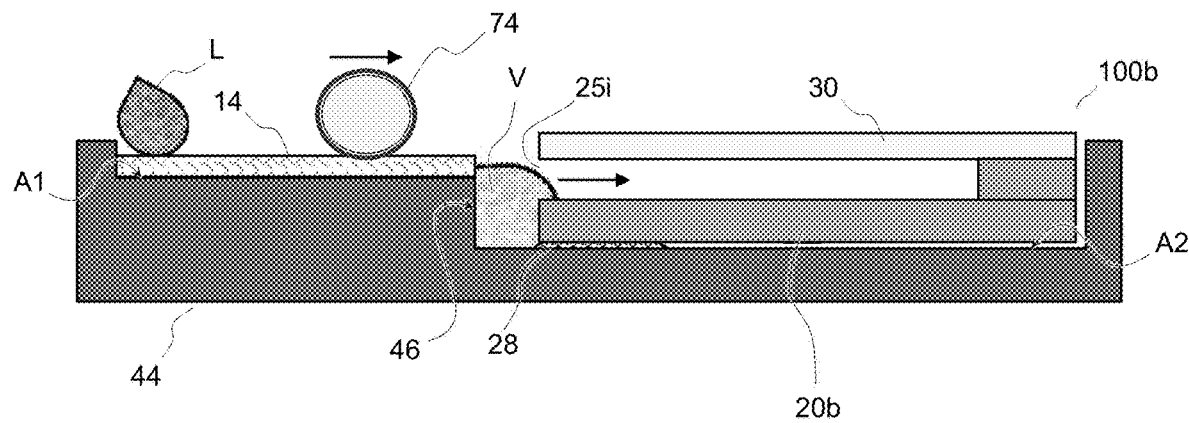
FIG. 7A depicts a 2D cross-sectional view of a configuration similar to that of FIG. 6D, except that the holder further comprises a second cavity delimiting an area to place the filtering medium, in accordance with embodiments of the present invention.
Figure 8A:
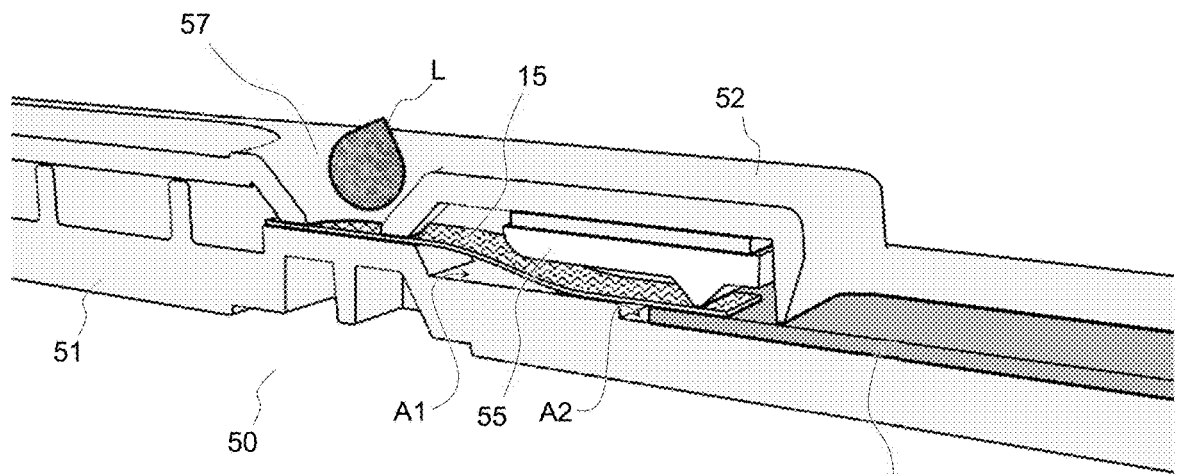
FIG. 8A is a 3D view (cutaway) of another configuration of the holder and the microfluidic device, where the holder is now fabricated as a clamping cartridge, where top and bottom parts of the cartridge pivot with respect to each other to allow compression of the filtering medium, in accordance with embodiments of the present invention.

In the examples of FIGS. 6D and 7A, the filtering medium 10 is positioned so as for a head edge $E_h$ thereof to reach and be level with an upper edge of the riser 46 of the holder 42, 44. The microfluidic device 100 is placed in the lower cavity defining the area A2, and possibly fixed therein. The channel 25 comprises an inlet 25*i* facing the riser 46, in the vicinity of the riser. Note, the microfluidic device 100*b* does not comprise any loading area 251 in that case (compare FIGS. 6A to 6C), as discussed below.

The extracted liquid volume V may reach the channel 25 of the microfluidic device 100 by flowing from the upper edge of the riser 46 up to the inlet 25*i* of the channel 25. The liquid droplets V extracted from the filtering medium 10 may not necessarily need to wet the riser surface (which may therefore be designed so as to be non-wetting for the liquids of interest), as suggested in FIG. 6D. Instead, the liquid droplets V extracted from the filtering medium 10 may possibly wet the inlet 25*i* directly, while being extracted from the filtering medium 10, and thus directly enter the channel 25, as assumed in FIG. 6D.

In variants, the extracted liquid may wet the surface of the riser 46, while flowing from the upper edge thereof, prior to reaching into the channel 25, as assumed in FIG. 7A. Note, the holders 42, 44 (shown in FIGS. 6D and 7A) are very similar, except that the holder 44 of FIG. 7 has an additional cavity (defining the area A1) for more precisely and conveniently placing the element 14, and the surface of the riser 46 is now made wetting for liquids of interest. The microfluidic device 100*b* shown in FIGS. 6D and 7 are identical and correspond to the microfluidic device 100*b* shown in FIG. 6C.

As further seen in FIG. 7A, the cavity that defines the second area A2 (where the microfluidic device 100*b* is positioned) may further be designed and dimensioned so as to allow the extracted liquid V to accumulate in the cavity, prior to entering the channel 25. The cavity may possibly be dimensioned so as to serve as a measure and be filled in accordance with the needs of the microfluidic device 100*b* (e.g., a chip). Accordingly, compression may be applied to the liquid-guiding element (e.g., element 14) so as to extract enough liquid V from the filtering medium 10 for the extracted liquid V to accumulate in the cavity before reaching the channel 25 of the microfluidic device 100*b*. For example, by precisely controlling the compression (e.g., using a compression roller 74) of the liquid-guiding element (e.g., element 14), the cavity may be filled up to a certain level, corresponding to the exact necessary quantity of liquid needed to fill the microfluidic device 100*b*.

As said, the microfluidic device 100*a*, 100*b* can be a microfluidic chip, such as shown in FIGS. 6A-6D, and 7A and 7B. The chip may possibly comprise a liquid loading area 251, as assumed in FIGS. 6A and 6B. In example embodiments, however, the microfluidic device 100*b* does not comprise any liquid loading pad. Instead, the microfluidic device 100*b* may have an aperture (i.e., a inlet 25*i* of a channel) provided on the edge facing the riser 46, as depicted in FIGS. 6C, 6D, and 7A. For example, the extracted liquid V may enter the channel 25 of the microfluidic chip, either directly (by wetting the inlet, as in FIG. 6D) or after having accumulated in the cavity housing the chip (as in FIG. 7A). The inlet 25*i* of the channel 25 may possibly have somewhat enlarged dimensions (diameter) compared to the average width of the channel 25.

Note, the cover layer 30 shown in FIGS. 6A and 6C is depicted in a cutaway fashion. FIGS. 6B and 6D depict approximate, schematic cross-sections of the microfluidic device 100*a*, 100*b* shown in the top views of FIGS. 6A and 6C, respectively.

A loading pad in a capillary-driven microfluidic chip is typically designed to hold 1 µl to 10 µl of liquid sample. The loading pad typically occupies more than 15% of the total chip area. Removing the loading pad results in reducing the size of the chip and the corresponding cost. However, applying a liquid from the side of a chip is not trivial. Thus, a convenient solution is to use a suitably designed holder for bridging liquid to the edge of the chip (as discussed above in reference to FIGS. 6D and 7A), which allows a reduced chip area, leading to lower costs, and eases the fabrication (also because the cover layer 30 does not need to be specifically patterned to allow access to the loading pad).

Figure 7B:
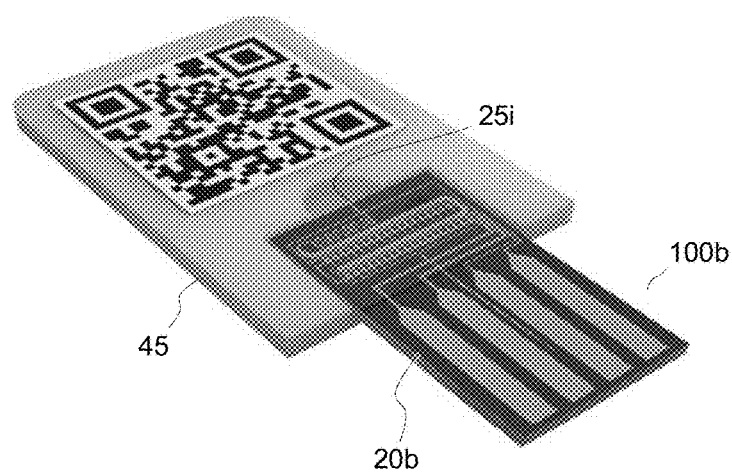
FIG. 7B depicts a 3D view of a configuration of a housing holder and a microfluidic device, where the housing encases a holder functionally similar to that of FIG. 7A, in accordance with embodiments of the present invention.

Interestingly, the filtering medium 10 (or the liquid-guiding component), the compression roller 74, and the holder may be fully enclosed inside a plastic housing 45, as depicted in FIG. 7B. The chip (e.g., microfluidic device 100*b*) is slidably inserted in a dedicated cavity.

Figure 9A:
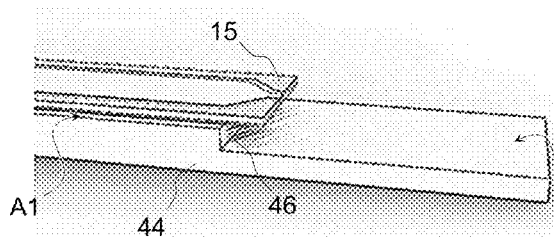
FIGS. 9A, 9B, 9C, 9D, 9E, and 9F illustrate a process through 3D views of configurations similar to that of FIG. 5B, in which microfluidic chips are sequentially placed in a dedicated cavity of the holder to process successive volumes of extracted liquid, in accordance with embodiments of the present invention.
Figure 9B:
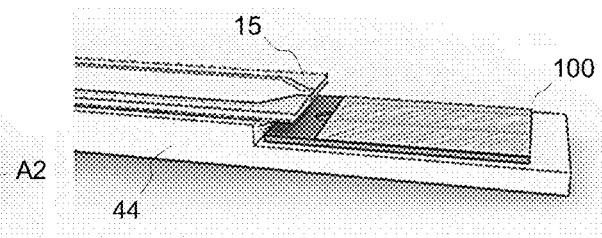
Figure 9C:
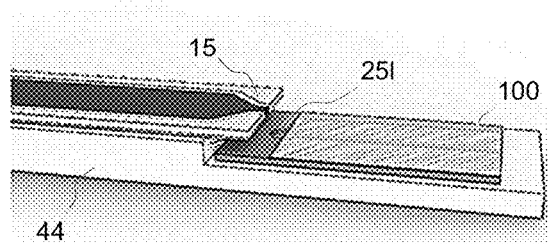
Figure 9D:
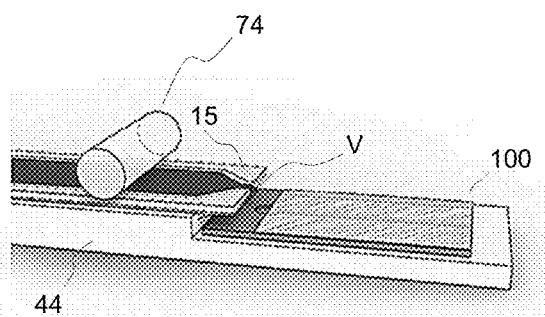
Figure 9E:
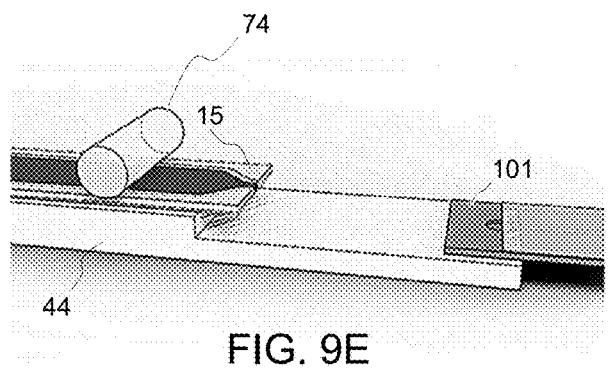
Figure 9F:
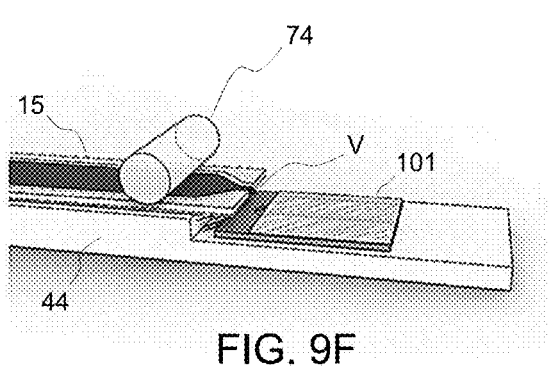

Next, further embodiments are discussed in reference to FIGS. 9A-9F, where a configuration similar to that of FIG. 5B is utilized to sequentially place microfluidic chips on the holder, in order to process successive volumes of extracted liquid. Namely, once liquid V has been extracted and introduced in a channel 25 of a first device (e.g., microfluidic device 100), in view of processing such liquid with the device (FIGS. 9A-9D). The first device (e.g., microfluidic device 100) is removed (FIG. 9E) and a second microfluidic device (e.g., microfluidic device 101) is placed (FIG. 9F) on the area A2 (e.g., by pushing and sliding the microfluidic device 101 until the device reaches the intended rest position). Compression is applied to the element 15 (and thus the filtering medium 10) to extract a further volume V of filtered liquid (FIG. 9F). A further volume V is thereby extracted, which reaches a channel 25 of the second microfluidic device (e.g., microfluidic device 100) via the flow path enabled by the configuration, in view of processing the further volume V with the second microfluidic device. The process may go on: the second device may then be removed in view of placing a third device, and so on.

Note, compression may possibly be interrupted while changing devices (i.e., microfluidic device 100). In variants, compression may be fully or partly maintained, so as to allow a further liquid volume to form at the output of the liquid-guiding element (e.g., element 15) while changing instances of microfluidic device 100. Once a new instance of microfluidic device 100 is put in place (e.g., a second microfluidic device), in the vicinity of the riser 46, the liquid droplet formed may reach a sufficient mass and detach from the head edge $E_h$ of the liquid-guiding element (e.g., element 15), to fall in the loading area 251 of the microfluidic device 100. The end surface of the cavity defining the area A2 may serve as a stop element for the introduced microfluidic device 100. In variants, additional stops are defined on the surface A2.

In variants to the configuration used in FIGS. 9A-9F, where the liquid-guiding element (e.g., element 15) overhangs the upper edge of the riser 46 and the microfluidic device 100 has a loading area 251 open on top (similar to the microfluidic device 100*a* shown in FIG. 6A), a microfluidic device 100*b* such as shown in FIG. 6C may be used, together with a holder 42 as shown in FIG. 6D. In that case, the extracted liquid volume V may directly wet the edge inlet 25*i* of the channel 25 when the microfluidic device 100*b* reaches a predefined position in the area A2.

Referring now to FIG. 8A, a further embodiment is described, wherein the holder 50 is configured as a clamping cartridge. Namely, the holder 50 comprises two elements 51, 52. element 51 serves as a support, where the distinct, flat areas A1, A2 are defined on element. The second element (i.e., element 52) includes a compression organ 55, which may have any convenient shape, as discussed earlier in reference to FIG. 1. The cartridge (e.g., holder 50) is designed so as to allow the second element (e.g., element 52) to pivot with respect to the first element (i.e., element 51). The two elements 51, 52 of the holder 50 (e.g., a cartridge) may possibly be connected as a hinge (e.g., via a pin) to rotate relative to each other about a fixed axis of rotation. In simpler embodiments, the elements are connected as a living hinge. The cartridge (e.g., holder 50) may possibly be 3D printed.

Thanks to the rotation axis, compression can simply be applied to the filtering medium 10 of the element 15 by pivoting the second element (e.g., element 52) with respect to the first element (i.e., element 51). The pivoting causes the compression organ 55 to press the filtering medium 10 and thereby extract a desired liquid volume V. Since the element 15 and the microfluidic device 100 are arranged on or within the element 51, one will normally pivot the element 52 with respect to the element 51, while maintaining the latter in position.

As further seen in FIG. 8A, the cartridge may be designed so as to provide a liquid loading area 57 upstream of the first area A1, where the liquid-guiding element (e.g., element 15) is placed. Note, other types of holders 41-44 (as described earlier) may similarly include a liquid loading area upstream the area A1. Utilizing the loading area 57, liquid L can easily be introduced in the porous filtering medium (e.g., filtering medium 10) of the element 15 via the liquid loading port.

Figure 8B:
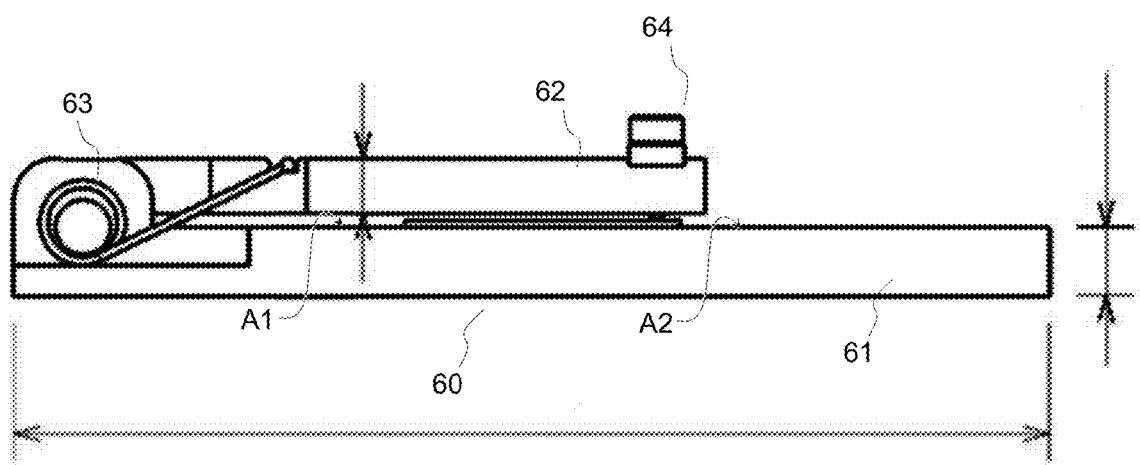
FIG. 8B illustrates a side view of a holder fabricated as a clamping device similar to that of FIG. 8A, except that top and bottom parts are now clipped together by a spring, in accordance with embodiments of the present invention.

In variants, the holder 60 may be designed as a clamping device, wherein the top element 62 and the bottom element 61 are now clipped together using a spring 63, as shown in FIG. 8B. A clamping piece 64 is screwed in the front of the top element 62. A downwardly protruding part (barely visible in FIG. 8B, which is to scale) comes to compress both the filter paper (not shown) and the microfluidic chip (not shown), assuming a configuration similar to that of FIG. 1. An advantage of a clamping device (e.g., holder 60) is the modularity: the design of the clamping piece 64 can be adjusted according to the needs and the clamping piece can easily be replaced.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method of processing a liquid with a microfluidic device, the method comprising:

positioning a porous filtering medium with respect to the microfluidic device, so as to allow a flow path between the filtering medium and a channel of the microfluidic device, wherein the microfluidic device comprises a substrate structured so as to form the channel and a cover layer covering a first portion of a top surface at a first distal end of the structured substrate, wherein the porous filtering medium comprises a planar shape and two lateral liquid-guiding barriers, each extending along two opposite longitudinal edges, wherein a minimal distance between the two lateral liquid-guiding barriers diminishes towards a head edge of a first distal end, so as to laterally guide liquid capillary pulled in the porous filtering medium along a direction of a length up to the head edge at the first distal end of the porous filtering medium, and wherein the porous filtering medium is positioned such that a bottom surface of the first distal end partially contacts an uncovered second portion of the top surface at a second distal end of the substrate, and the head edge at the first distal end of the porous filtering medium is flush against a head edge of the cover layer, such that a connection of the porous filtering medium and the channel of the microfluidic device allow communication of the liquid;

introducing the liquid in the porous filtering medium for the liquid to advance along and be filtered by the filtering medium;

applying compression to the filtering medium to extract a given liquid volume of the filtered liquid from the filtering medium, whereby the extracted liquid volume reaches said channel via the flow path; and processing the extracted liquid volume with the microfluidic device.

2. The method according to claim 1, wherein the porous filtering medium is positioned so as to contact a holder.

3. The method according to claim 2, wherein:

the porous filtering medium is positioned so as for at least a portion of the porous filtering medium to contact a surface of the holder, and applying compression to the filtering medium comprises rolling a compression roller onto said at least a portion of the filtering medium.

4. The method according to claim 2, wherein:

the porous filtering medium is positioned so as to contact the holder, which is designed so as to allow said flow path, and the method further comprises positioning the microfluidic device for the microfluidic device to contact the holder, prior to introducing the liquid in the porous filtering medium.

5. The method according to claim 4, wherein:
the holder comprises distinct, flat areas, including a first area and a second area, and
the filtering medium and the microfluidic device are positioned in the first area and the second area, respectively, and are maintained in said first area and said second area while applying compression to the filtering medium.

6. The method according to claim 5, wherein the holder further comprises a riser separating said first area and said second area, the riser delimiting said flow path.

7. The method according to claim 6, wherein the filtering medium is positioned so as for a head edge thereof to reach an upper edge of the riser, said channel comprises an inlet facing the riser, whereby the extracted liquid volume reaches the channel of the microfluidic device by flowing along the riser, from the upper edge of the riser to the inlet of the channel.

8. The method according to claim 6, wherein:
the holder further comprises a cavity that includes the second area, in which the microfluidic device is positioned, and
applying compression to the filtering medium is performed so as to extract enough liquid from the filtering medium for the extracted liquid to accumulate in the cavity before reaching the channel of the microfluidic device.

9. The method according to claim 5, wherein:
the holder comprises a liquid loading port upstream of the first area, and
said liquid is introduced in the porous filtering medium via the liquid loading port.

10. The method according to claim 5, wherein the method further comprises:
removing the microfluidic device after the extracted liquid volume has reached the channel; and
placing a further microfluidic device on the second area.

11. The method according to claim 10, wherein the method further comprises:
applying compression to the filtering medium to extract a further volume of filtered liquid, whereby the further volume extracted reaches a channel of the further microfluidic device via the flow path; and
processing the further volume extracted with the further microfluidic device.

12. The method according to claim 5, wherein:
the holder is designed as a cartridge comprising two elements, including a first element having said distinct, flat areas, and a second element that includes a compression organ, and
applying compression to the filtering medium further comprises pivoting the second element with respect to the first element for the compression organ to press the filtering medium and thereby extract said liquid volume.

13. A microfluidic device for processing a liquid comprising:
a microfluidic chip comprising:
a substrate structured so as to form a channel and a cover layer covering a first portion of a top surface at a first distal end of the structured substrate; and
an uncovered second portion of the top surface at a second distal end of the substrate, and
a liquid-guiding element comprising:
a porous filtering medium, wherein the filtering medium has a planar shape with a base delimited by two opposite head edges and two opposite longitudinal edges, wherein the head edges extend along a width of the base and the longitudinal edges extend along a length of the base, an average height of the shape being substantially smaller than the length of the base;
is configured for capillary pulling liquid along both a direction of the length and a direction of the width; and
comprises two lateral liquid-guiding barriers, each extending along a respective one of the longitudinal edges, wherein a minimal distance between the two lateral liquid-guiding barriers diminishes towards a head edge of a first distal end, so as to laterally guide liquid capillary pulled in the filtering medium along the direction of the length up to the head edge of the first distal end of the filtering medium, in operation of the liquid-guiding element, and
wherein the uncovered second portion of the top surface at the second distal end of the substrate is configured to receive a bottom surface of the first distal end of the porous filtering medium, such that the head edge at the first distal end of the porous filtering medium remains flush against a head edge of the cover layer, wherein a connection of the porous filtering medium and the channel of the microfluidic chip allow communication of the liquid.

14. The microfluidic device according to claim 13, wherein each of the two lateral liquid-guiding barriers extends across as full height of the filtering medium and comprises one selected from the group consisting of: a resin, wax, and dichtol.

15. The microfluidic device according to claim 13, wherein the liquid-guiding element further comprises two coatings sealing opposite main surfaces of the filtering medium.

16. The microfluidic device according to claim 15, wherein each of the coatings includes one selected from the group consisting of a laminate, a tape, and a wax print.

17. The method according to claim 1, wherein the channel includes an aperture that receives the liquid from the first distal end of the porous filtering medium.

18. The method according to claim 1, wherein a compression element is configured to extract a defined amount of the liquid into the aperture of the channel.

* * * * *